July 10, 1928.  1,676,290
C. SCHRON
WORK HOLDER
Filed May 27, 1927   2 Sheets-Sheet 1
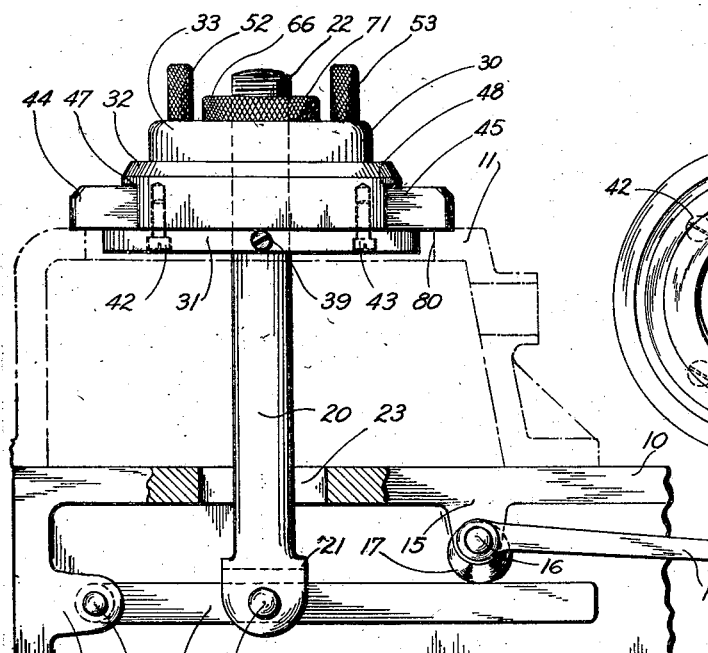
Fig. 1
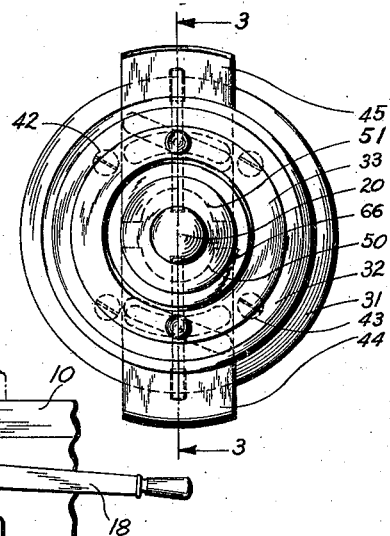
Fig. 2
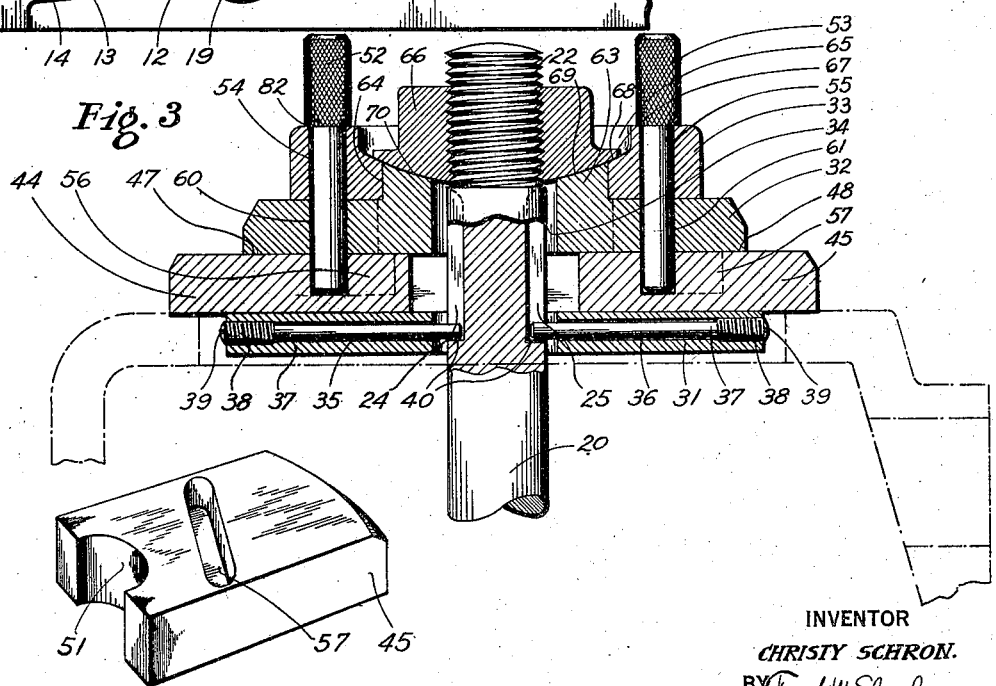
Fig. 3
Fig. 6
INVENTOR
CHRISTY SCHRON.
BY Frank M. Slough
ATTORNEY.

July 10, 1928.
C. SCHRON
WORK HOLDER
Filed May 27, 1927    2 Sheets-Sheet 2
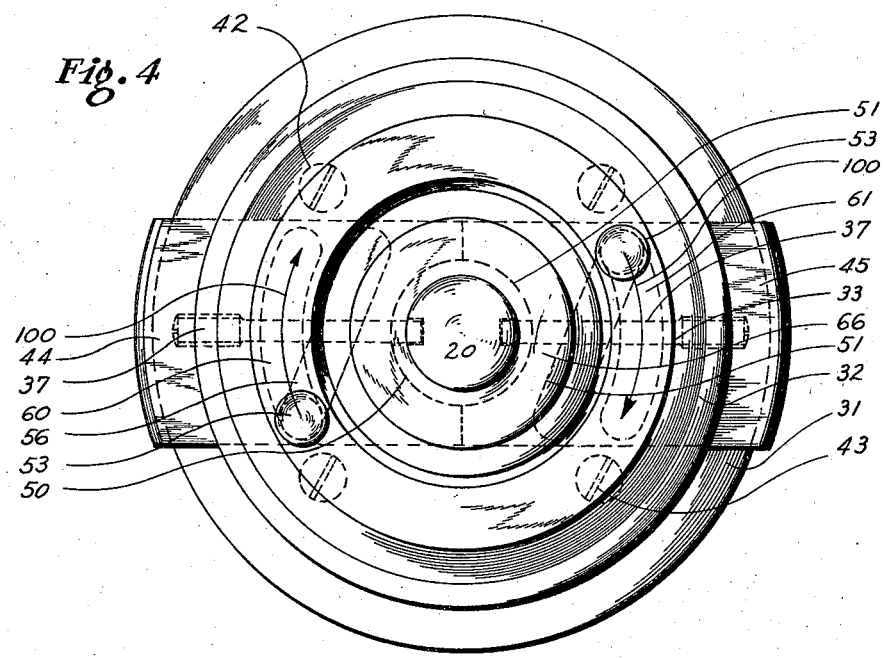
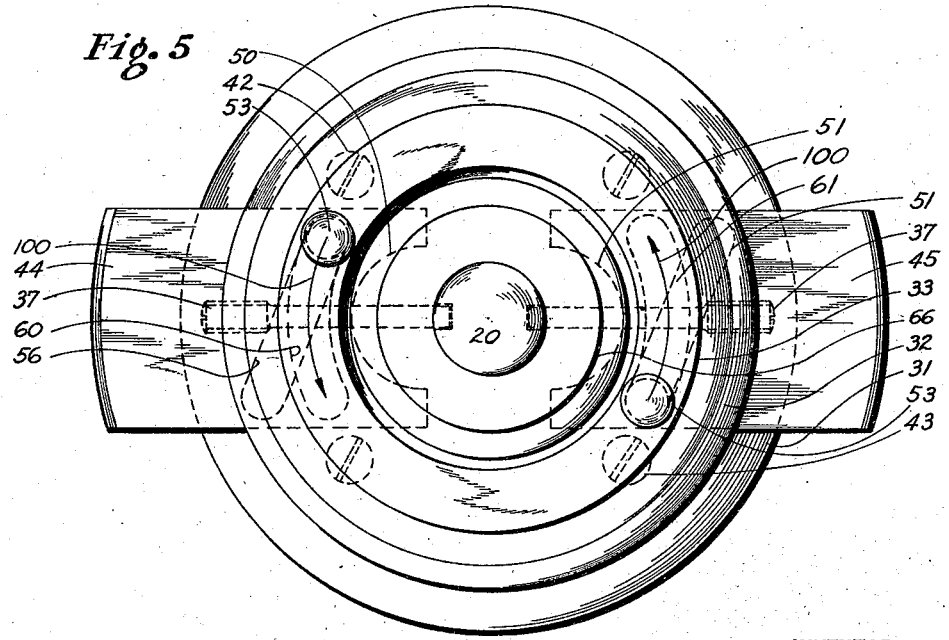
INVENTOR
CHRISTY SCHRON
BY
His ATTORNEY.

Patented July 10, 1928.

1,676,290

UNITED STATES PATENT OFFICE.

CHRISTY SCHRON, OF CLEVELAND, OHIO, ASSIGNOR TO THE WHITE MOTOR COMPANY, OF CLEVELAND, OHIO, A CORPORATION OF OHIO.

WORK HOLDER.

Application filed May 27, 1927. Serial No. 194,599.

My invention relates to an improved work holder and more particularly it relates to a mechanism for holding hollow castings stationary during a machining operation thereon.

An object of my invention resides in the provision of an improved work holder which will rigidly retain the work against movement relative to a tool, during a machining operation thereon, and which may be operated expeditiously.

Another object of my invention resides in the provision of a work holding mechanism, which may be made of varying sizes, whereby it may be interchangeably employed with castings of numerous dimensions.

Another object of my invention resides in the provision of an improved work holding mechanism capable of being adjusted to adapt itself to a particular piece of work to be operated upon.

Another object of my invention resides in the provision of an improved work holder which is durable in construction, readily operable and wherein provision is made for replacement of worn parts.

These and other objects of my invention and the invention itself will become apparent from reference to the following description of an embodiment thereof and in which description reference will be had to the accompanying drawings forming a part of this specification.

Referring to the drawings:

Fig. 1 is a sectional view of a fragment of a metal working machine embodying my invention in elevation;

Fig. 2 is a top plan view of the foregoing embodiment illustrating in dotted lines an intermediate operative position thereof;

Fig. 3 is a transverse sectional view of the foregoing embodiment, the view being taken on the line 3—3 of Fig. 2, the parts being enlarged in this view over similar parts in the foregoing figures;

Fig. 4 is a top plan view of the foregoing embodiment illustrating one operative position of the same;

Fig. 5 is a view similar to Fig. 4 illustrating another operative position of my invention; and Fig. 6 is a perspective view of one of the bolts employed in the foregoing embodiment.

Referring to all of the figures of the drawings in all of which like parts are designated by like reference characters, at 10, I show a base or table portion of a machine adapted to perform machining operations upon a piece of metallic work 11 supported thereon. My improved work holder preferably comprises a lever 12 pivoted at 13 to a lug 14 of the table and extends horizontally a relatively short distance under the table below a depending lug 15 carried by the table into which a transversely disposed shaft 16 is journaled. Said shaft is provided with a cam 17 at one end thereof and an operating handle lever 18 at the other end, both non-rotatably secured to the shaft 16, whereby swinging of the handle 18 in a downward direction will rotate the high point of the cam into engagement with the lever 12 adjacent the free end thereof, swinging the lever downwardly on its pivot. Pivoted to the lever 12 intermediate its ends, at 19, I provide a vertically disposed post having a bifurcated lower end 21 disposed over the lever 12 and a threaded upper end 22.

Said post extends upwardly through an aperture 23 in the table 10 and the upper end of the post is provided with a pair of diametrically opposed longitudinally extending key slots 24 and 25.

Mounted on the post 20 adjacent the upper end thereof is an expansible work engaging head generally indicated by the reference numeral 30, said head preferably comprises a plurality of superposed plates or disks 31, 32 and 33. Each of the plates are centrally apertured to provide an axially extending bore 34 through which the post 20 projects. The bottom-most plate 31 is provided with a pair of diametrically opposed radial bores 35 and 36 having threaded mouths, into which pins 37 are disposed having threaded outer end portions 38 threaded into the mouths of the bores. The pins 37 are provided with the usual screw-driver receiving slots 39. The inner ends of the pins 37 extend into the diametrically opposed key slots 24 and 25 and are adapted to rest upon the end walls 40 of the key slots, to support the head on the post 20.

Secured to the plate 31 by machine screws 42 and 43, is an intermediately disposed plate 32 having radially extending slots 47 and 48 therein of rectangular configuration. A pair of bolts 44 and 45 are inserted into the radially extending slots 47 and 48 of a size substantially the size of the slots, to provide a snug fit therein so that they may be reciprocated in the slots and guided by the walls thereof, the plate 31 providing the supporting base upon which the bolts slide.

The inner opposed ends of the bolts 44 and 45 are provided with semi-circular recesses 50 and 51, whereby they will not engage with the post 20 when in their innermost contracted positions, but will provide a circular clearance recess, when jointed together, for the post.

The bolts may be reciprocated inwardly or outwardly by means of a pair of vertically disposed pins 52 and 53 having enlarged knurled portions, the shoulders 82 of which rest on the edges of apertures 54 and 55 diametrically opposite each other in the topmost plate 33. The pins extend downwardly through the apertures, and through arcuate slots 60 and 61 in the intermediate plate 32, terminating in angularly disposed grooves 56 and 57 in the upper faces of the bolts, whereby an operator may grasp the knurled portions of the pins 52 and 53 and by oscillating or partially rotating the same within the arcuate slots will cause the lower ends of the pins to engage the side walls of the grooves 56 and 57 effecting a camming action thereon to simultaneously reciprocate the bolts towards or away from each other depending upon the position to which the operator desires to move them. The angular grooves are parallel to each other and on an angle tangential to the post 20.

Oscillation of the pins 52 and 53 may be effected simultaneously by movement of but one of the pins by virtue of the topmost plate 33 which is connected with both of the pins.

The topmost plate is provided with a central bore of a size relatively larger than the bores of the other two plates. An upstanding flange 63 preferably formed integral with the plate 32 telescopes into the bore of the top plate and snugly fits therein to provide a bearing portion 64 about which the plate 33 may be revolved. The bore of the plate 33 is enlarged at 65 for the reception of a retaining nut 66 having an annular flange 67. The base wall 68 and the top wall 69 of the bore 65 and the upstanding flange 63, respectively, are concaved to receive the convex base surface 70 of the nut 66, which when threaded onto the post 20 and tightened down by an operator grasping the knurled portion 71 thereof, will cause the nut to engage the concaved surfaces 68 and 69 of the plates 33 and 32 and secure the plate 33 against rotation.

In use, a piece of work 11, such for example as one of the castings of an automobile which is to receive machining operations thereon, is placed on the table 10 of a metal working machine, and the herein described embodiment may be operated as follows:

The lever 18 is swung to a vertical position permitting the post 20 to move vertically, which post extends through a relatively large aperture 80 in the top wall of the work. The head 30 is disposed above the top wall of the work in alignment with the aperture 80 and the bolts 44 and 45 have been contracted into the position shown in Fig. 4 of the drawings. The work holder when so positioned, the nut 66 is turned down into contact with the concave faces of the plates 32 and 33, after the head has been properly adjusted on the pivot to the desired height, to hold the same against accidental displacement. The aperture 80 of the work is of a size sufficient to permit the work to be placed over the head 30 and post 20 when the head is in non-expanded position.

The work may now be disposed about the post and below the head and properly centered relative to the metal work tool. The operator may rotate one of the pins 52 or 53 in the direction of the arrows 100 of Fig. 4, which in turn effects a camming action on the sides of the grooves 56 and 57 of the bolts 44 and 45 reciprocating the same in opposite directions radially into the position indicated in Figs. 1, 3 and 5.

The bolts 44 and 45 may be sufficiently expanded to bridge the aperture 80 of the work and contact with the top wall of the work in the manner shown in Figs. 1 and 3. Bolts may be constructed in varying lengths, whereby they may be employed on work of varying sizes wherein the distance to be bridged may be greater or less than the diameter of the aperture 80 illustrated in the present embodiment of my invention.

Operator now swings the lever 18 downwardly into the horizontal position, as shown in Fig. 1 of the drawings, thereby rotating the cam 17, the high point of which contacts with the lever 12 effecting a downward pull thereon and on the post 20 and head 30 causing the bolts 44 and 45 to rigidly engage with the top wall of the work 11 effectively securing the work in its indexed position relative to the tool.

The head 30 may at all times be carried on the post 20 thereby eliminating time lost by an operator in locating and disposing the ordinary C-bolt washer which has heretofore been used for the herein described purpose and which many times becomes displaced due to its detachable form. One of the advantages of my invention is to eliminate the necessity of requiring such a washer. The head 30 may, however, when desired, be removed from the post 20, by withdrawing the threaded pins 37 radially from the slots 24 and 25 of the post 20 and by unscrewing the bolt 66 from the head of the post.

Having thus described my invention in a specific embodiment, I am aware that numerous and extensive departures may be made from the embodiment herein illustrated and described but without departing from the spirit of my invention.

I claim:

1. In a device for holding work during a machining operation thereon, the combination with a work supporting frame, of an expansible head, adjustable mounting means for the head, said head comprising a pair of reciprocable bolts, and means mounted in the head for reciprocating the bolts towards and away from each other into engagement with an upper surface of the work to hold the same in the frame, said adjustable mounting means comprising a post supported on the frame, and means for reciprocating said post to effect movement of the head.

2. In a work holder, the combination with a work supporting base, of an expander head for engaging the work, adjustable mounting means for the head, said head comprising a plurality of superposed plates, a radial bore in the intermediate plate, bolts disposed in said bore and movable away from each other, a pair of arcuate slots in the topmost plate of said head, an angular groove disposed in each bolt below said slots, pins extending through the slots into the grooves and adapted when the pins are moved in the arcuate slots to reciprocate the bolts towards or away from each other.

3. In a device of the class described, the combination with a base, of a work holder comprising a vertically disposed post, an expander head carried on the post, said head comprising bottom, intermediate and top plates, means to retain the plates on the post, transverse bores extending across the intermediate plate, and arcuately disposed slots therein, a pair of reciprocable bolts slidable in said bores, angular grooves in said bolts disposed below the arcuate slots, pins carried by the top plate and extending through said slots into the grooves whereby movement of the pins will reciprocate the bolts, and means for moving the work holder into and out of engagement with the work.

4. In a device for holding work during a machining operation thereon, the combination with a work supporting frame, of an expansible head, adjustable mounting means for the head, said head comprising a pair of reciprocable bolts, and means mounted in the head for reciprocating the bolts towards and away from each other into engagement with an upper surface of the work to hold the same in the frame, said adjustable mounting means comprising a post, a lever pivoted to the frame, said post pivoted to the lever intermediate the ends thereof, and means for swinging the lever to effect movement of the head.

5. In a device for holding work during a machining operation thereon, the combination with a work supporting frame, of an expansible head, adjustable mounting means for the head, said head comprising a pair of reciprocable bolts, and means mounted in the head for reciprocating the bolts towards and away from each other into engagement with an upper surface of the work to hold the same in the frame, said adjustable mounting means comprising a post extending upwardly through an aperture in the frame, a lever pivoted to the frame, said post pivoted to the lever intermediate the ends thereof, said post having an end thereof screw-threaded, said head threaded thereon, and means for swinging said lever to effect movement of the head.

6. In a device for holding work during a machining operation thereon, the combination with a work supporting frame, of an expansible head, adjustable mounting means for the head, said head comprising a pair of reciprocable bolts, and means mounted in the head for reciprocating the bolts towards and away from each other into engagement with an upper surface of the work to hold the same in the frame, said adjustable mounting means comprising a post projected through an aperture in the frame, a lever pivoted to said frame, said post pivoted to the lever, said post having a longitudinally extending slot adjacent the upper end thereof, said head having a projecting portion adjusted to engage said slot for supporting the same on the post, means for swinging said lever to effect movement of the head.

7. In a device for holding work during a machining operation thereon, the combination with a work supporting frame, of an expansible head, adjustable mounting means for the head, said head comprising a pair of reciprocable bolts, and means mounted in the head for reciprocating the bolts towards and away from each other into engagement with an upper surface of the work to hold the same in the frame, said adjustable mounting means comprising a post projecting upwardly through an aperture in the frame, a lever pivoted to the frame, said post pivoted to said lever, a cam journaled in the frame, and engaging the lever and a handle projecting laterally of the frame, for rotating said cam.

8. In a device for holding work during a machining operation thereon, the combination with a work supporting frame, of an expansible head, adjustable mounting means for the head, said head comprising a pair of reciprocable bolts, and means mounted in the head for reciprocating the bolts towards and away from each other into engagement with an upper surface of the work to hold the same in the frame, said adjustable mounting means comprising a vertically disposed post projected through an aperture in the frame, a lever pivoted to the frame, said post pivoted to the lever intermediate the ends thereof, the upper end of the post being screw threaded and said head having a portion threaded thereon, said post having a pair of longitudinally extending slots below the threaded portion, pins carried by the head and longitudinally slidable within the slots, and a cam journaled in the frame, and engageable with the lever, a handle projecting laterally of the frame and adapted to rotate the cam to swing the lever to move the head.

9. A device for holding a piece of work centered relative to a tool, the combination with a supporting frame, of an expansible mechanism for engaging the work, comprising a head, an adjustable mounting means for the head, said head comprising a plurality of superposed plates, the intermediate of said plates having radial bores, bolts disposed in said bores and movable away from each other, a pair of arcuate slots in the topmost plate of the head, each bolt being transversely obliquely grooved below said slots, pins extending through the slots into the grooves and adapted when oscillated to reciprocate the bolts toward and away from each other, transversely disposed pins carried by the lowermost plate of the head, said plates being centrally bored, a nut, said adjustable mounting means comprising a vertically disposed bolt extending through an aperture in the frame, a lever pivoted to the frame, said bolt being pivoted at one end to the lever and having the upper end thereof threaded, said bolt also provided with a pair of longitudinally extending slots, said nut adapted to be threaded onto the threaded end of the bolt for clamping the plates together and said transverse pins adapted to engage the slots and support the head on the post, a cam journaled in the frame and engaging an end of the lever and a handle extending laterally of the frame, for rotating the cam to reciprocate the head whereby the bolts engage the topmost portion of the work.

In testimony whereof I hereunto affix my signature this 25th day of May, 1927.

CHRISTY SCHRON.